United States Patent
Zolotow et al.

(10) Patent No.: US 10,656,975 B2
(45) Date of Patent: May 19, 2020

(54) HYBRID CLOUD WITH DYNAMIC BRIDGING BETWEEN SYSTEMS OF RECORD AND SYSTEMS OF ENGAGEMENT

(71) Applicant: INTERNATIONAL BUSINESS MACHINES CORPORATION, Armonk, NY (US)

(72) Inventors: Clea Zolotow, Key West, FL (US); Florian Graf, Zurich (CH); Petra Kopp, Toenisvorst (DE); Laxmikantha S. Nanduru, R K Puram Post (IN); Mihai Criveti, Bucharest (RO); Richard J. Baird, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/012,049

(22) Filed: Jun. 19, 2018

(65) Prior Publication Data
US 2019/0384653 A1 Dec. 19, 2019

(51) Int. Cl.
*G06F 9/54* (2006.01)
*G06F 9/50* (2006.01)

(52) U.S. Cl.
CPC ............ *G06F 9/541* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 8,806,015 B2 | 8/2014 | Dutta et al. | |
| 9,009,697 B2 | 4/2015 | Breiter et al. | |
| 9,063,789 B2 | 6/2015 | Beaty et al. | |
| 9,269,114 B2 | 2/2016 | Boss et al. | |
| 9,692,632 B2 | 6/2017 | Bhattacharya et al. | |
| 9,742,873 B2 | 8/2017 | Ananthanarayanan et al. | |
| 2007/0180451 A1* | 8/2007 | Ryan | G06F 9/505 718/104 |
| 2013/0198050 A1 | 8/2013 | Shroff et al. | |
| 2015/0067019 A1* | 3/2015 | Balko | H04L 67/10 709/202 |
| 2016/0285966 A1 | 9/2016 | Brech et al. | |

OTHER PUBLICATIONS

Staimer, "Why IBM z System Mainframe Cloud Storage is No Longer an Oxymoron", http://wwwdragonslayerconsulting.com/whitepaper, 2016, 8 pages.

(Continued)

*Primary Examiner* — Shih-Wei Kraft
(74) *Attorney, Agent, or Firm* — James Nock; Andrew D. Wright; Roberts Calderon Safran & Cole, P.C.

(57) ABSTRACT

Systems and methods for dynamically bridging between Systems of Record and Systems of Engagement are disclosed, including: receiving a request to provision a new workload in a distributed computing environment; identifying a plurality of components available in a system of record (SoR); receiving a selected component of at least one of the plurality of components available in the SoR; and provisioning the new workload by creating a data flow using the selected component.

6 Claims, 7 Drawing Sheets

(56) References Cited

OTHER PUBLICATIONS

Anonymous, "Optimal Workload Placement for Public, Hybrid, and Private Clouds", Intel, https://www.intel.com/optimal-workload-placement-for-public-hybrid-and-private-clouds, Apr. 3, 2017, 10 pages.

Anonymous, "Moving to Cloud? System z provides key capabilities for optimizing workloads on Private/Hybrid Cloud", http://www.SHARE.org/Pitttsburgh-Eval, Share, 2016, 30 pages.

Anonymous, "Method for Proactive and Predictive RPO Calculation on Complex Hybrid Cloud IT Environments by Implementing a Smart Provisioning Model", ip.com, May 20, 2016, 8 pages.

Anonymous, "System and Method for Workload Driven Dynamic Cloud", ip.com, Jan. 17, 2017, 7 pages.

Anonymous, "Dealing with Workload's Criticality in a Cloud Environment", ip.com, Jun. 19, 2012, 4 pages.

Anonymous, "Selective Distribution of Workload in a Multi-Tenant Environment", ip.com, Mar. 15, 2012, 8 pages.

Sherrill, "Building an API Bridge to Your IBM z Systems Applications and Data", http://www.redbooksibm.com/redpapers/pdfs/redp5296.pdf, IBM Redbooks, 2015, 10 pages.

Seager et al., "Creating a Service Catalog for services in WebSphereService Registry and Repository", http://www.ibm.com/developerworks/websphere/library/techarticles/1210_seager/1210_seager.html, IBM developerWorks, Oct. 10, 2012, 20 pages.

Anonymous, "Working with Products in the API Designer", http://www.ibm.com/support/knowledgecenterSSMNED_5.0.0/com.ibm.apic.toolkit.doc/capim_products.html, Mar. 2, 2018, 5 pages.

Anonymous, "Overview | Cloud Foundry Docs", https://docs.cloudfoundry.org/services/overview.html, Mar. 23, 2018, 2 pages.

Bagwell et al., "WebSphere Liberty z/Os Connect", http://www-01.ibm.com/support/docview.wss?uid=tss1wp102439&aid=3, IBM, Jan. 13, 2015, 32 pages.

Anonymous, "WebSphere Optimized Local Adapters", https://en.wikipedia.org/wikiWebSphere_Optimized_Local_Adapters, Wikipedia, accessed Mar. 21, 2018, 13 pages.

Anonymous, "IBM cloudMatrix", https://web.archive.org/web/20160507220828/http://www-03.ibm.com/software/products/en/cloudmatrix, accessed Jun. 18, 2018, 3 pages.

Mell et al., "The NIST Definition of Cloud Computing", NIST, Special Publication 800-145, Sep. 2011, 7 pages.

* cited by examiner

HYBRID CLOUD WITH DYNAMIC BRIDGING BETWEEN SYSTEMS OF RECORD AND SYSTEMS OF ENGAGEMENT

BACKGROUND

The present invention generally relates to computing devices and, more particularly, to systems and methods for dynamically bridging between Systems of Record and Systems of Engagement.

Systems of Record (SoRs) include legacy information technology assets, such as mainframe computers. Systems of Engagement (SoEs) include web-facing systems and applications, including mobile and cloud computing software and services. Systems of Interaction (SoIs) provide for connectivity between SoRs and SoEs. Users may create an application programming interface (API) to act as an SoI that bridges between an SoR and an SoE. An SoI may be created based upon the particular requirements of the specific SoR and the specific SoE that are being connected.

SUMMARY

In a first aspect of the invention, there is a method that includes: receiving, by a computing device, a request to provision a new workload in a distributed computing environment; identifying, by the computing device, a plurality of components available in a system of record (SoR); receiving, by the computing device, a selected component of at least one of the plurality of components available in the SoR; and provisioning, by the computing device, the new workload by creating a data flow using the selected component.

In another aspect of the invention, there is a computer program product that includes a computer readable storage medium having program instructions embodied therewith. The program instructions are executable by a computing device to cause the computing device to: receive a request to provision a new workload in a distributed computing environment; identify a plurality of components available in a system of record (SoR); receive a selected component of at least one of the plurality of components available in the SoR; and provision the new workload by creating a data flow using the selected component.

In another aspect of the invention, there is a system that includes: a hardware processor, a computer readable memory, and a computer readable storage medium associated with a computing device; program instructions of a service catalog accessor configured to invoke a database of prior connections to a plurality of components in a system of record (SoR); program instructions of a discovery process invoker configured to invoke a discovery process to identify the plurality of components in the SoR; and program instructions of a data flow creator configured to receive a selected component of at least one of the plurality of components in the SoR, provision a new workload by creating a data flow using the selected component, and add the data flow to the database of prior connections, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
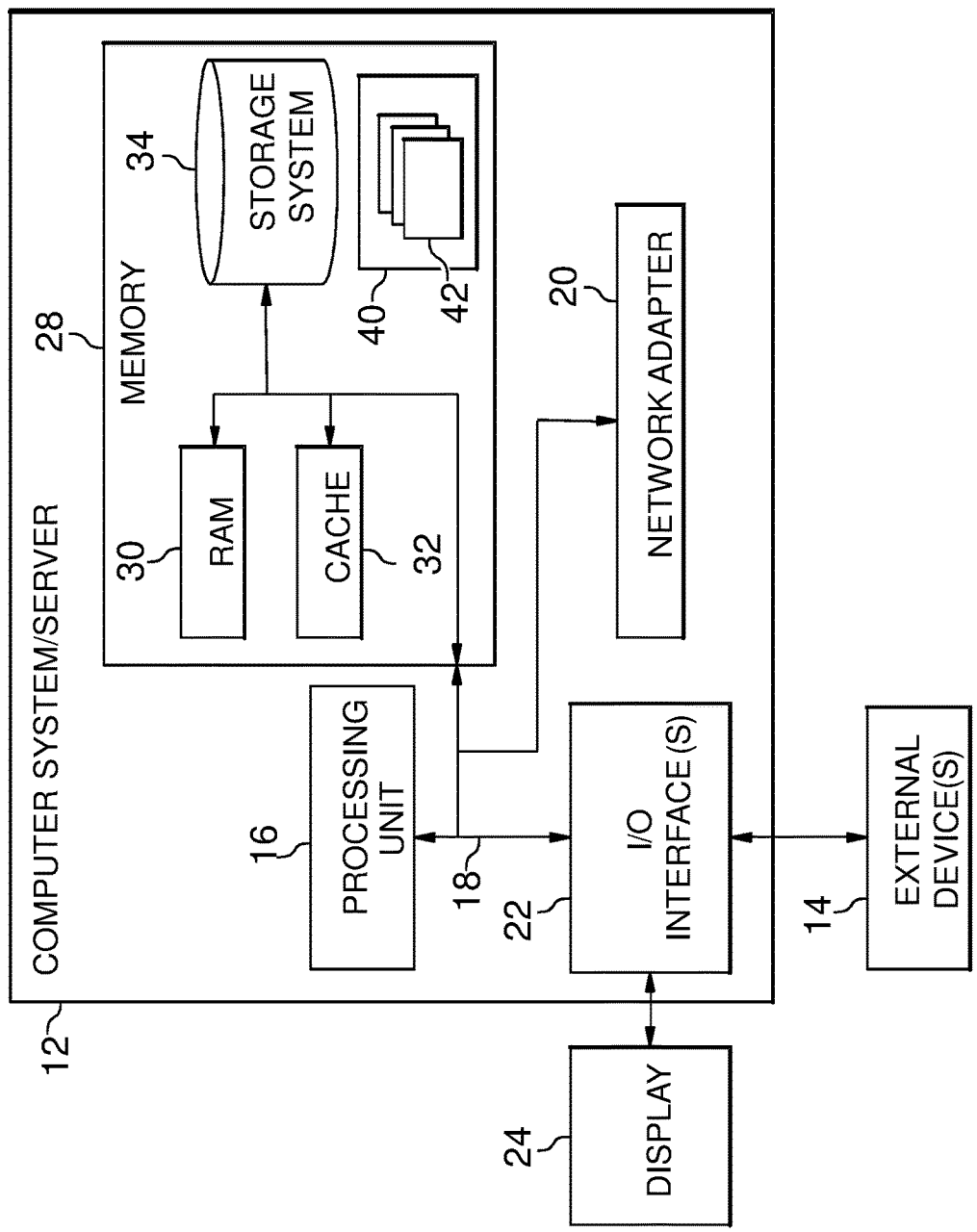
FIG. 1 depicts a cloud computing node in accordance with aspects of the invention.

The present invention generally relates to computing devices and, more particularly, to systems and methods for dynamically bridging between Systems of Record and Systems of Engagement. As described herein, aspects of the invention are directed to a System of Interaction (SoI) that provides a dynamic connection between a System of Record (SoR) and a System of Engagement (SoE). The SoI includes an application programming interface (API) that functions as a reusable module that connects one or more SoRs and one or more SoEs. The SoI is integrated with cloud brokerages (e.g., products used to plan, buy, and manage information technology resources across a cloud, including provisioning and scaling workloads) and orchestration products (e.g., products that manage interactions among workloads) and the SoRs such that it is held for reuse. The SoI may be implemented using Java and/or optimized local adapters (e.g., WOLA) that facilitate communication between the SoRs and the SoEs.

Hybrid clouds (described in further detail below) and associated cloud brokerage products today cover only SoEs, not the SoRs. The ability to provision new workloads is usually not available via a mainframe operating system or virtual machine hypervisors running on the mainframe. Additionally, the ability to attach to SoRs utilizing brokerage products is also not available in the related art. For example, related art brokerage products cannot dynamically instantiate an SoI relying on mainframe data. Related art solutions instead rely on user-created APIs as an SoI to connect SoRs and SoEs.

Aspects of the invention provide an SoI as a connection in order to dynamically utilize different interactive constructs to bridge between SoRs and SoEs in an environment with Software Defined Networking (SDN). This bridge utilizes an API-based environment for transactions and also provides a discovery mechanism that may be presented via a service catalog for SoR instantiation. The SoI may be supported by multiple architectures (e.g., multiple application and integration middleware) and multiple platforms (e.g., midrange platforms, co-location with the SoE, or in its own virtual machine or container). Accordingly, aspects of the invention create a bridge between legacy systems (e.g., SoRs) and mobile and cloud applications (e.g., SoEs). Additionally, brokerage services may be integrated with SoRs.

Aspects of the invention include using the same data dictionary for both the SoRs and the SoEs and providing an API that instantiates based upon the data dictionary. Other aspects of the invention including using a cognitive engine (including machine learning) to map the APIs of the SoRs and create a translation table covering each API in use.

Further, the cognitive engine determines the types of data access (e.g., structured query language or extract, transform, load (ETL)) and the placement of the system for maximum benefit (e.g., based upon the types of database queries being performed or an ETL process being performed).

Accordingly, embodiments of the invention improve the functioning of a computer by providing for bridging SoRs and SoEs. In particular, embodiments facilitate the integration of mainframes and their data into brokerage services for hybrid clouds. Additionally, embodiments utilize Queued Direct Input Output (QDIO) for middleware residing on mainframes to reduce or eliminate performance bottlenecks from SoRs to SoEs as the data does not have to go through a small pipe such as a midrange network interface controller (NIC) or virtual network interface controller (vNIC) attached to a VLAN and be transferred to another system via a cable, such as a shared 1 GbE connection.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
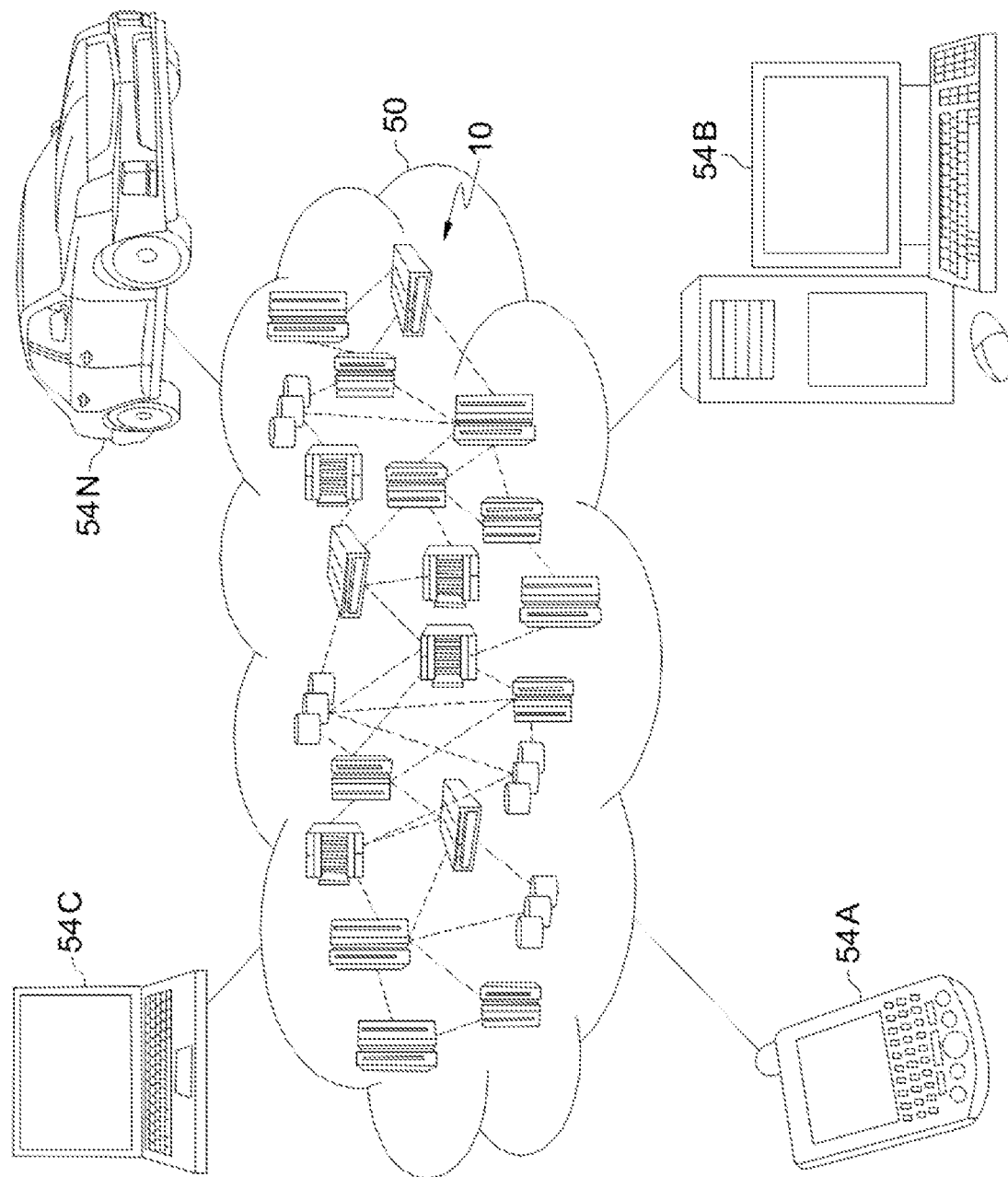
FIG. 2 depicts a cloud computing environment in accordance with aspects of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
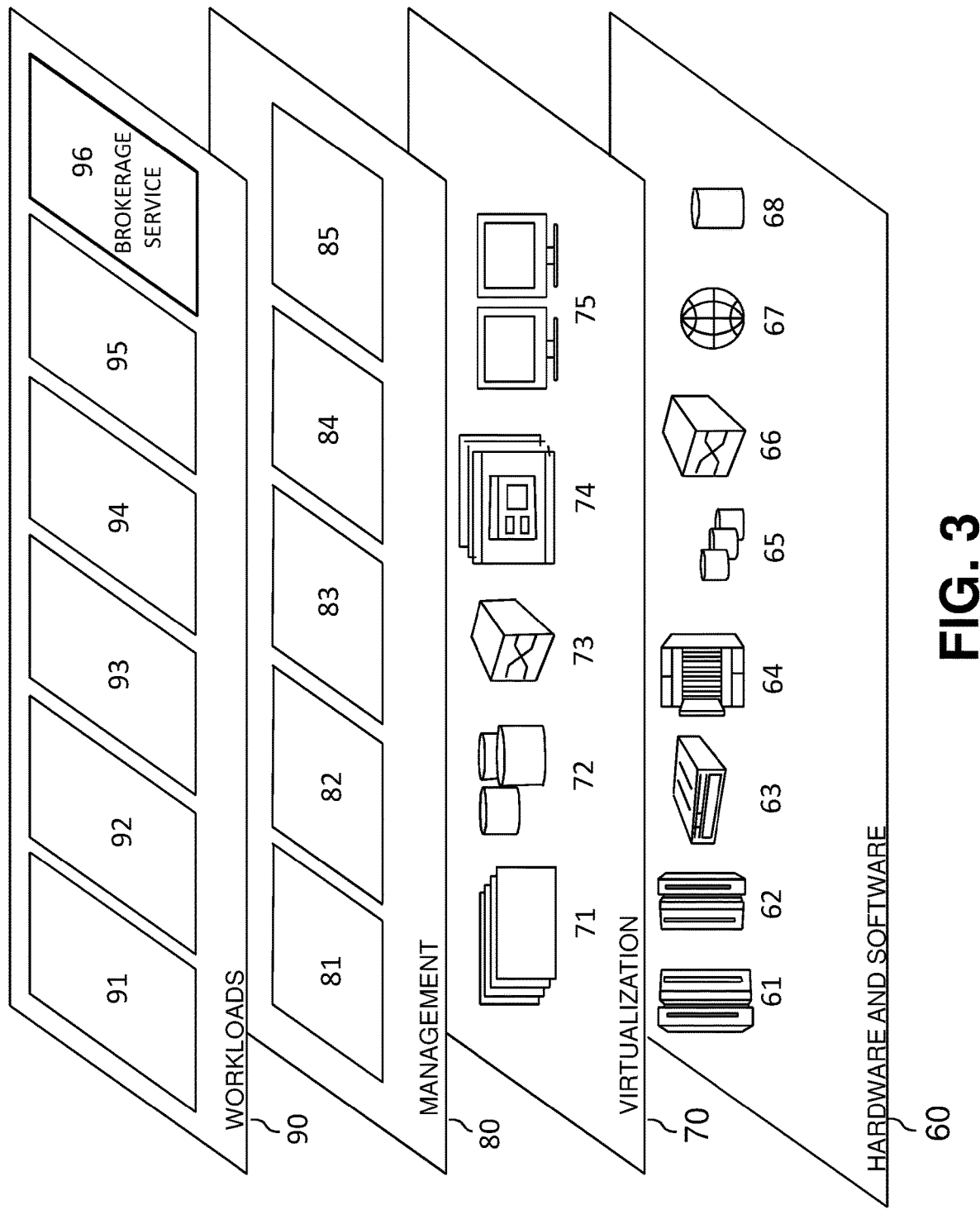
FIG. 3 depicts abstraction model layers in accordance with aspects of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and brokerage service 96.

Referring back to FIG. 1, the program/utility 40 may include one or more program modules 42 that generally carry out the functions and/or methodologies of embodiments of the invention as described herein (e.g., such as the functionality provided by brokerage service 96). Specifically, the program modules 42 may receive a request to provision a new workload in a distributed computing environment such as a hybrid cloud; identify a plurality of components available in a SoR; receive a selected component of at least one of the plurality of components available in the SoR; and provision the new workload by creating a data flow using the selected component. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a computer server (mainframe) 410 as shown in FIGS. 4 and 5.

Figure 4:
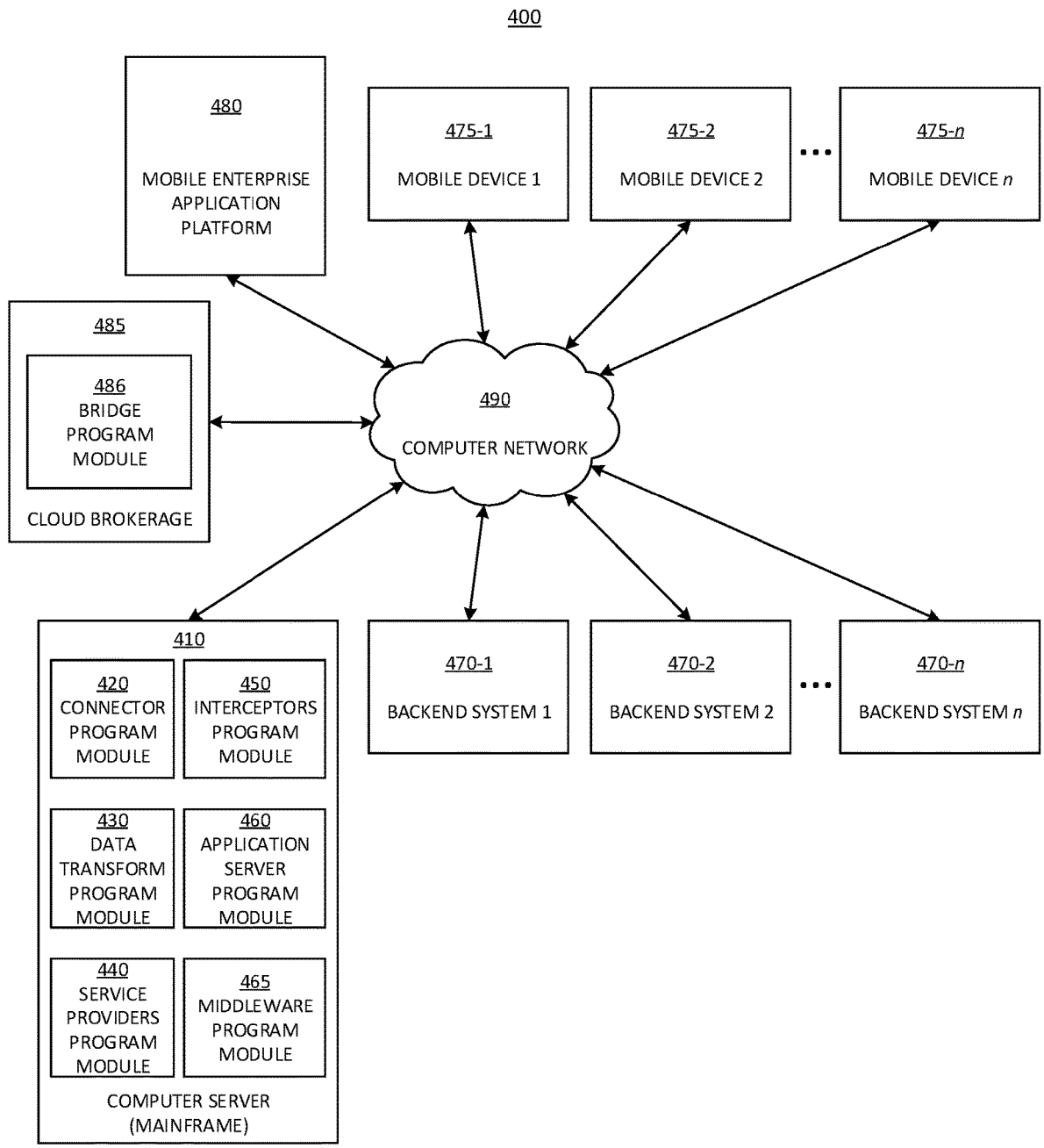
FIG. 4 depicts an illustrative environment in accordance with aspects of the invention.
Figure 5:
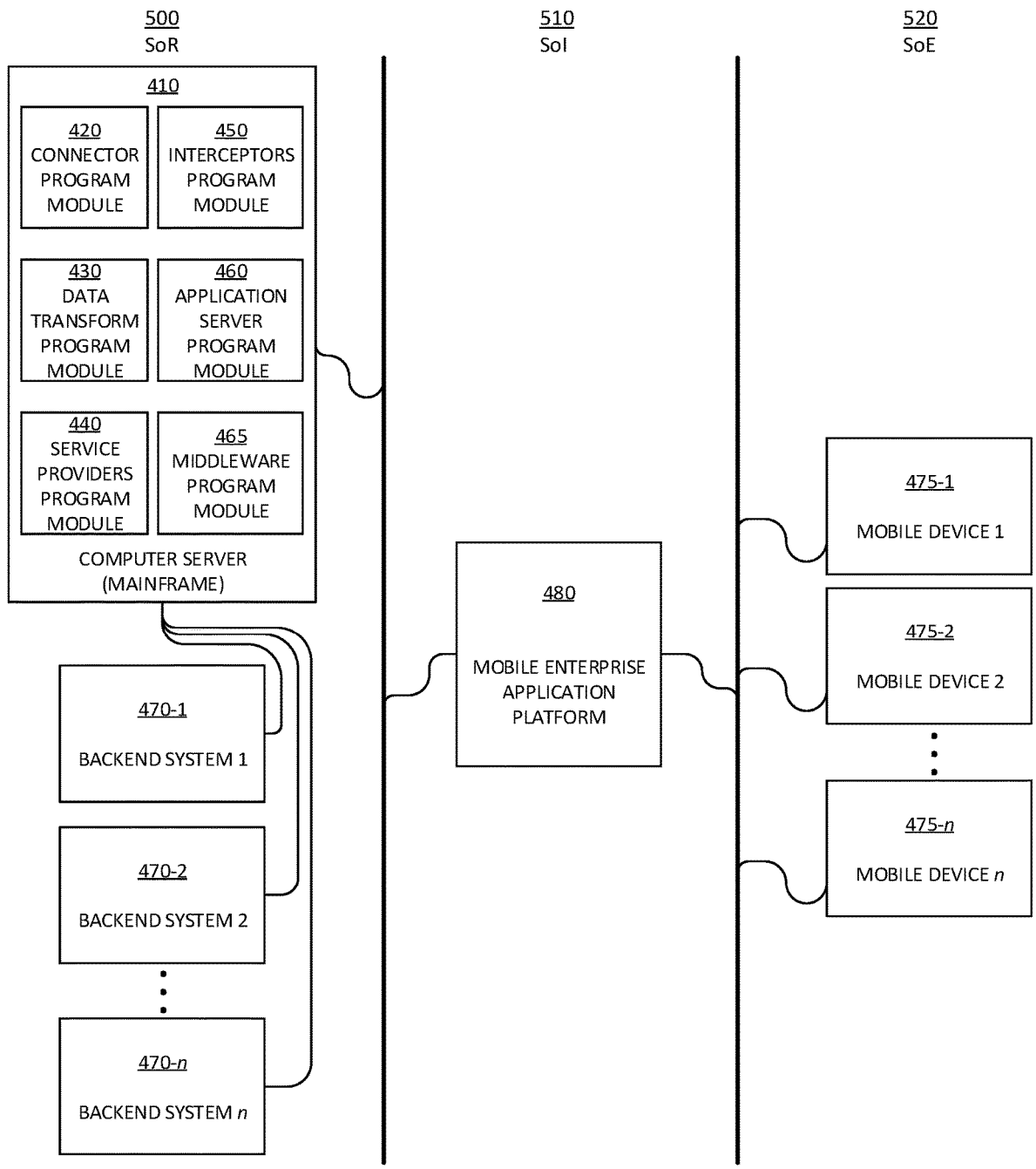
FIG. 5 depicts an exemplary data flow in accordance with aspects of the invention.

FIG. 4 depicts an illustrative environment 400 in accordance with aspects of the invention. As shown, the environment 400 comprises a computer server (mainframe) 410, a plurality of backend systems 470-1, 470-2, ..., 470-n, a plurality of mobile devices 475-1, 475-2, ..., 475-n, a mobile enterprise application platform 480, and a cloud brokerage 485 that are in communication with each other via a computer network 490. The computer network 490 may be any suitable network such as a LAN, WAN, or the Internet. The computer server (mainframe) 410, the plurality of backend systems 470-1, 470-2, ..., 470-n, the plurality of mobile devices 475-1, 475-2, ..., 475-n, the mobile enterprise application platform 480, and the cloud brokerage 485 may be physically collocated, or may be situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the computer server (mainframe) 410 in the environment 400 may be situated in the cloud computing environment 50 on one or more of the nodes 10 shown in FIG. 2. The computer server (mainframe) 410 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. The computer server (mainframe) 410 may be a component of the SoR.

In embodiments, the computer server (mainframe) 410 includes a connector program module 420, a data transform program module 430, a service providers program module 440, an interceptors program module 450, an application server program module 460, and one or more middleware program modules 465, each of which may include hardware and/or software and may be one or more of the program modules 42 shown in FIG. 1.

Still referring to FIG. 4, in embodiments, the connector program module 420 includes program instructions for providing a common and consistent entry point for mobile access (e.g., by one or more of the mobile devices 475-1, 475-2, ..., 475-n) to one or more of the backend systems 470-1, 470-2, ..., 470-n using RESTful (Representational State Transfer) URIs (Uniform Resource Identifiers) with JSON (JavaScript Object Notation) data payloads. The connector program module 420 provides this mobile access to one or more of the backend systems 470-1, 470-2, ..., 470-n by communicating with the data transform program module 430, the service providers program module 440, the interceptors program module 450, the application server program module 460, and the one or more middleware program modules 465. The program instructions included in the connector program module 420 of the computer server (mainframe) 410 may be executed by one or more hardware processors.

In embodiments, the data transform program module 430 includes program instructions for transforming JSON data payloads received by the connector program module 420 to a layout or format required by the application server program module 460, one or more of the middleware program modules 465, and/or one or more of the backend systems 470-1, 470-2, ..., 470-n. The service providers program module 440 includes program instructions for providing connectivity, via the application server program module 460 and/or one or more of the middleware program modules 465, to one or more of the backend systems 470-1, 470-2, ..., 470-n. The interceptors program module 450 includes program instructions for callout points where software can be invoked to do things such as authorization and activity recording. The program instructions included in the data transform program module 430, the service providers program module 440, and the interceptors program module 450 of the computer server (mainframe) 410 may be executed by one or more hardware processors.

Still referring to FIG. 4, in embodiments, the application server program module 460 includes program instructions for creating and running web applications (e.g., mobile applications). The one or more middleware program modules 465 include program instructions for providing various services to software applications, including transaction processing, database services, and information management services of the backend systems 470-1, 470-2, ..., 470-n, among others. The one or more middleware program modules 465 may communicate with one or more of the backend systems 470-1, 470-2, ..., 470-n. The program instructions included in the application server program module 460 and the one or more middleware program modules 465 of the computer server (mainframe) 410 may be executed by one or more hardware processors.

Still referring to FIG. 4, in embodiments, the backend systems 470-1, 470-2, ..., 470-n in the environment 400 may be situated in the cloud computing environment 50 on one or more of the nodes 10 shown in FIG. 2. Each of the backend systems 470-1, 470-2, ..., 470-n may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. Each of the backend systems 470-1, 470-2, ..., 470-n be a component of the SoR and may provide transaction processing, database services, and information management services, among others.

Still referring to FIG. 4, in embodiments, each of the plurality of mobile devices 475-1, 475-2, ..., 475-n in the environment 400 may be a mobile device such as a cellular phone, tablet, personal digital assistant (PDA), laptop computer, or any other mobile computing device. Alternatively, each of the plurality of mobile devices 475-1, 475-2, ..., 475-n may be a a desktop computer or any other computing device. Each of the plurality of mobile devices 475-1, 475-2, ..., 475-n may be used by an end user, a customer, or any other user. Each of the plurality of mobile devices 475-1, 475-2, ..., 475-n may be components of the SoE or may run software components of the SoE.

In embodiments, the mobile enterprise application platform 480 in the environment 400 may be situated in the cloud computing environment 50 on one or more of the nodes 10 shown in FIG. 2. The mobile enterprise application platform 480 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. The mobile enterprise application platform 480 may be a component of the SoI that provides functionality for efficiently developing, testing, connecting, running, and managing mobile applications running on each of the of the plurality of mobile devices 475-1, 475-2, ..., 475-n. The mobile enterprise application platform 480 may include a development environment and mobile-optimized runtime middleware.

Still referring to FIG. 4, in embodiments, the cloud brokerage 485 in the environment 400 may be situated in the cloud computing environment 50 on one or more of the nodes 10 shown in FIG. 2 and may be an example of brokerage service 96 shown in FIG. 3. The cloud brokerage 485 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the cloud brokerage 485 includes a bridge program module 486 which includes program instructions for integrating an SoR, including the computer server (mainframe) 410, with an SoE, including each of the plurality of mobile devices 475-1, 475-2, ..., 475-n or software components running thereon, in the cloud computing environment 50, which may be a hybrid cloud. The bridge program module 486 is described in greater detail below with respect to FIGS. 5, 6, and 7. The program instructions included in the bridge program module 486 of the cloud brokerage 485 may be executed by one or more hardware processors.

FIG. 5 depicts an exemplary data flow in accordance with aspects of the invention. In embodiments, the SoR 500 includes the computer server (mainframe) 410 and the plurality of backend systems 470-1, 470-2, ..., 470-n. The SoI 510 includes the mobile enterprise application platform 480, and the SoE 520 includes the plurality of mobile devices 475-1, 475-2, ..., 475-n.

In embodiments, the connector program module 420 includes a Java-based API and/or an API based on local adapters for the application server program module 460. Using the Java-based API and/or the local adapter API, the connector program module 420 connects to each of the plurality of backend systems 470-1, 470-2, ..., 470-n, for example, via the one or more middleware program modules 465. Using a bridge dynamically created by the bridge program module 486 of the cloud brokerage 485 using a reusable API, data flows between the connector program module 420 and the computer server (mainframe) 410 in the SoR 500 to the mobile enterprise application platform 480 in the SoI 510. Finally, data flows between the mobile enterprise application platform 480 in the SoI 510 to each of the plurality of mobile devices 475-1, 475-2, ..., 475-n or software components running thereon in the SoE 520.

According to another embodiment, the middleware program modules 465 may be located externally to the computer server (mainframe) 410, for example, in the SoI 510 as part of the mobile enterprise application platform 480. Additionally, data may flow between the mobile enterprise application platform 480 in the SoI 510 and a web-facing logical partition (LPAR) in the SoE 520.

Figure 6:
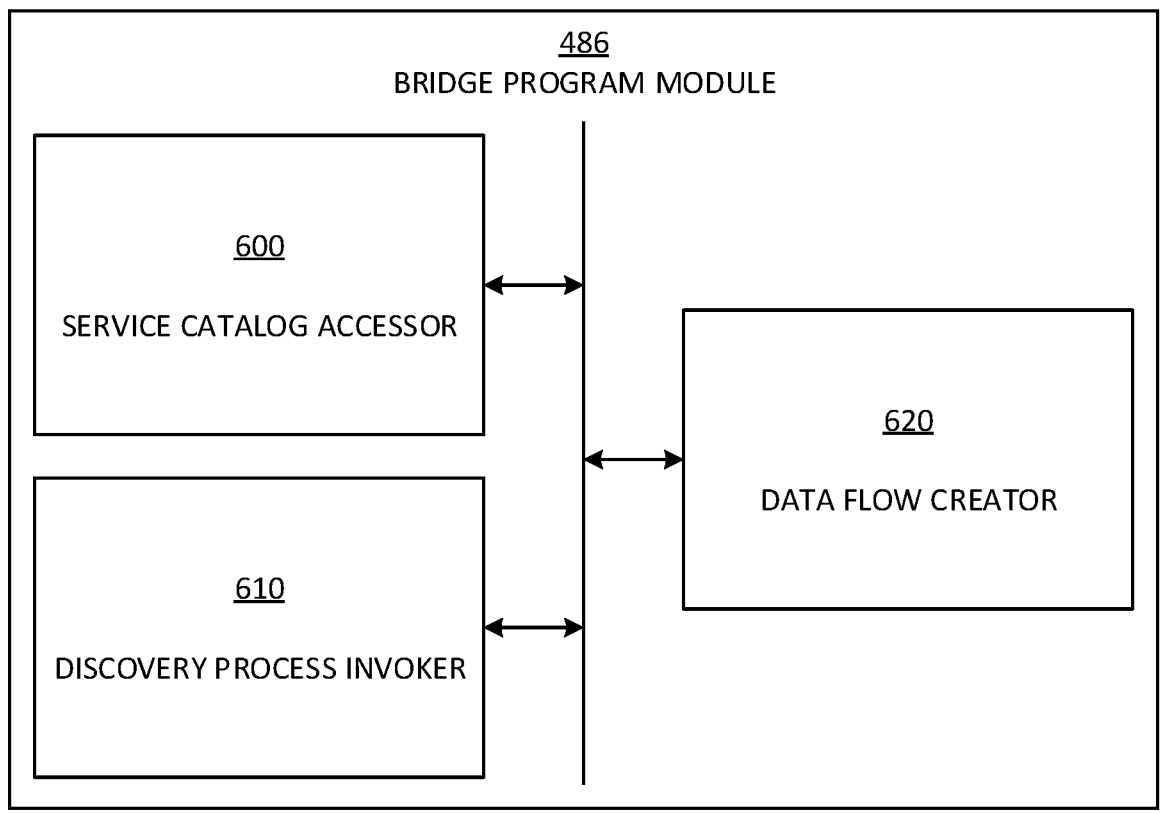
FIG. 6 depicts a block diagram of an exemplary program module in accordance with aspects of the invention.

FIG. 6 depicts a block diagram of an exemplary bridge program module 486 in the cloud brokerage 485 (of FIG. 4) in accordance with aspects of the invention. In embodiments, the bridge program module 486 includes a service catalog accessor 600, a discovery process invoker 610, and a data flow creator 620, each of which may comprise one or more program modules 42 as described with respect to FIG. 1. In embodiments, the bridge program module 486 may include additional or fewer components than those shown in FIG. 6. In embodiments, separate components may be integrated into a single computing component or module. Additionally, or alternatively, a single component may be implemented as multiple computing components or modules.

In embodiments, in response to the bridge program module 486 receiving a request (e.g., from a developer or other user) to provision a new workload across a hybrid cloud, the service catalog accessor 600 accesses an orchestration component (e.g., the computer server (mainframe) 410) with a service catalog. Specifically, the service catalog accessor 600 accesses the service catalog via the connector program module 420, the application server 460, and/or the middleware 465. The service catalog may be stored in the computer server (mainframe) 410 or any location accessible to the computer server (mainframe) 410. Alternatively, the service catalog may be stored in the mobile enterprise application platform 480 or the cloud brokerage 485, or in any location accessible to the mobile enterprise application platform 480 or the cloud brokerage 485.

The service catalog accessor 600, in accessing the service catalog, may communicate with the connector program module 420 using RESTful URIs with JSON data payloads. The service catalog invokes a database of prior connections to components within the SoR, and sends information about the prior connections from the database, via the connector program module 420, to the service catalog accessor 600.

Still referring to FIG. 6, in embodiments, if the service catalog accessor 600 and/or the service catalog does not find any prior connections, the discovery process invoker 610 invokes a discovery process in the computer server (mainframe) 410 to identify the components available in the SoR (e.g., in the computer server (mainframe) 410). The discovery process invoker 610 may communicate with the connector program module 420 using RESTful URIs with JSON data payloads to start the discovery process and receive information about components available in the SoR, identified in the discovery process.

For example, the discovery process invoker 610 may receive, via the connector program module 420, information about the one or more middleware program modules 465 on the computer server (mainframe) 410 (including information various services provided, including transaction processing, database services, and information management services) and the one or more of the backend systems 470-1, 470-2, . . . , 470-n with which the one or more middleware program modules 465 communicate.

Still referring to FIG. 6, in embodiments, the data flow creator 620 receives a selection of one or more of the components available in the SoR, selected from either the information about the prior connections to components within the SoR received by the service catalog accessor 600 or from the information about the components available in the SoR identified by the discovery process invoker 610. The selection may be made by a user or by another program module in the cloud computing environment 50.

In response to receiving the selection of one or more of the components available in the SoR, the data flow creator 620 creates a data flow, either automatically or based upon input from a user (e.g., a developer). As described with respect to FIG. 5, the data flow creator 620 dynamically creates a bridge using a reusable API and utilizing the SoI 510 as a connection between the SoR 500 and the SoE 520, thereby provisioning a new workload across the hybrid cloud. After a data flow is created, the data flow creator 620 may bundle the data flow into the service catalog for storage in the database of prior connections.

In particular, using the Java-based API and/or the API based on local adapters for the application server program module 460, the connector program module 420 connects to each of the plurality of backend systems 470-1, 470-2, . . . , 470-n associated with the selected one or more components, for example, via the one or more middleware program modules 465 associated with the selected one or more components. Data flows between the connector program module 420 and the computer server (mainframe) 410 in the SoR 500 to the mobile enterprise application platform 480 in the SoI 510. Finally, data flows between the mobile enterprise application platform 480 in the SoI 510 to each of the plurality of mobile devices 475-1, 475-2, . . . , 475-n or software components running thereon in the SoE 520. As described above, the data flows into and out of the connector program module 420 using RESTful URIs with JSON data payloads.

Figure 7:
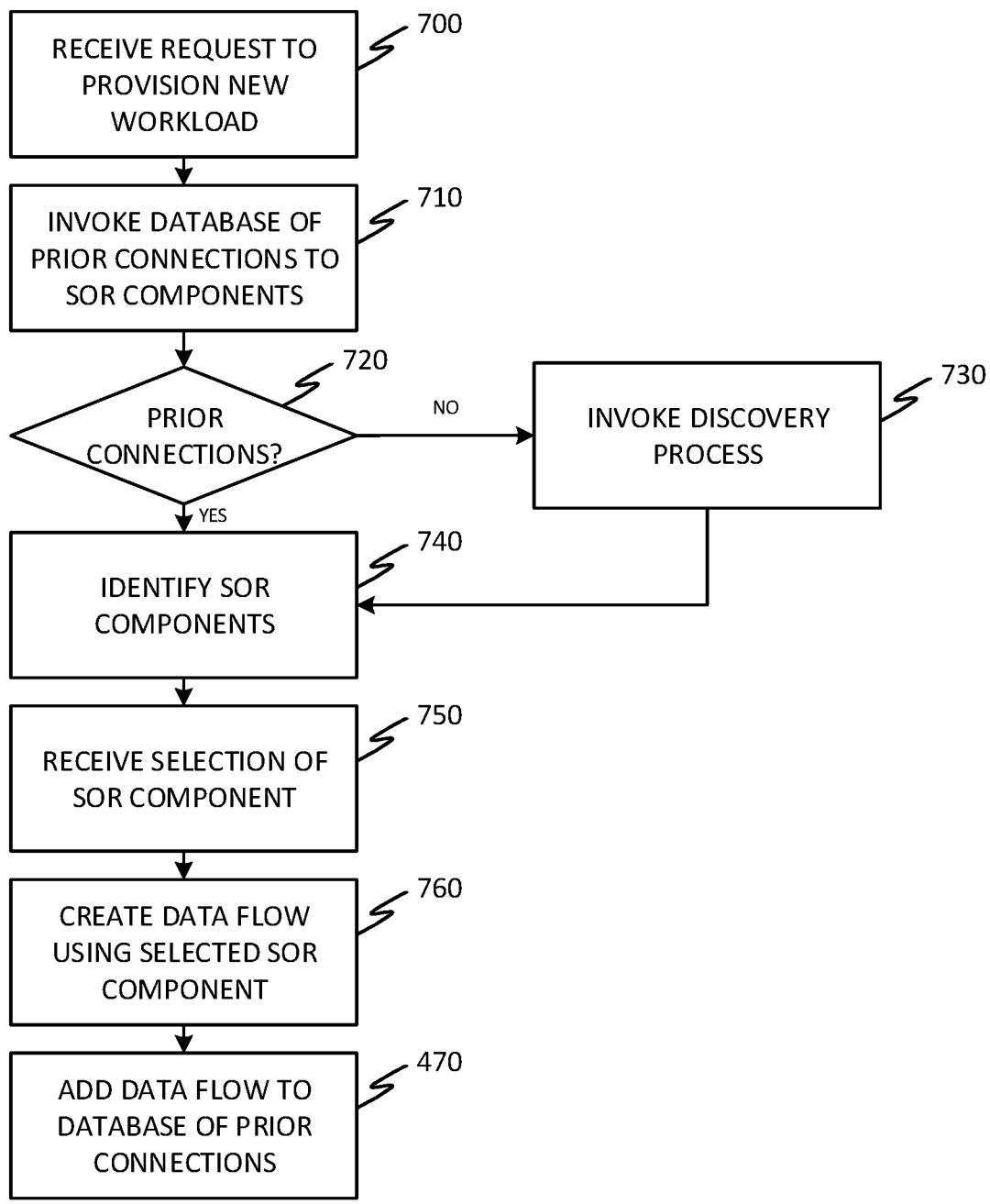
FIG. 7 depicts a flowchart of an exemplary method in accordance with aspects of the invention.

FIG. 7 depicts a flowchart of an exemplary method in accordance with aspects of the invention. The steps of the method may be performed in the environment of FIG. 4 and are described with reference to the elements and steps described with respect to FIGS. 5 and 6.

At step 700, the system receives a request (e.g., from a developer or other user) to provision a new workload across a hybrid cloud. In embodiments, as described with respect to FIG. 6, step 700 comprises the bridge program module 486 receiving the request from the developer or other user.

At step 710, the service catalog invokes a database of prior connections to components within the SoR. In embodiments, as described with respect to FIG. 6, step 710 comprises the service catalog accessor 600 accessing an orchestration component with the service catalog. For example, the service catalog accessor 600 may access the service catalog via the connector program module 420, the application server 460, and/or the middleware 465.

At step 720, the service catalog accessor determines whether any prior connections to components within the SoR were found. In embodiments, as described with respect to FIG. 6, step 720 comprises the service catalog accessor 600 determining whether any prior connections to components within the SoR were received from the service catalog via the connector program module 420. If it is determined at step 720 that no prior connections were found, then the flow proceeds to step 730, and a discovery process is invoked. On the other hand, if it is determined at step 720 that prior connections were found, then the flow jumps to step 740, and the components available in the SoR are identified.

At step 730, a discovery process is invoked. In embodiments, as described with respect to FIG. 6, step 730 comprises the discovery process invoker 610 invoking a discovery process in the computer server (mainframe) 410 to identify the components available in the SoR (e.g., in the computer server (mainframe) 410).

At step 740, components available in the SoR are identified. In embodiments, as described with respect to FIG. 6, step 740 comprises the service catalog accessor 600 identifying the prior connections to components within the SoR and/or the discovery process invoker 610 identifying the information about the components available in the SoR.

At step 750, a selection of a SoR component is received. In embodiments, as described with respect to FIG. 6, step 750 comprises the data flow creator 620 receiving a selection of one or more of the components available in the SoR, selected from either the information about the prior connections to components within the SoR received by the service catalog accessor 600 or from the information about the components available in the SoR identified by the discovery process invoker 610. The selection may be made by a user or by another program module in the cloud computing environment 50.

At step 760, a data flow is created using the selected component. In embodiments, as described with respect to FIG. 6, step 760 comprises the data flow creator 620 creating a data flow, either automatically or based upon input from a user (e.g., a developer). As described with respect to FIG. 5, the data flow creator 620 utilizes the SoI 510 as a connection in order to bridge between the SoR 500 and the SoE 520, thereby provisioning a new workload across the hybrid cloud.

At step 770, the data flow is added to the database of prior connections. In embodiments, as described with respect to FIG. 6, step 770 comprises the data flow creator 620 bundling the data flow into the service catalog for storage in the database of prior connections.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, a request to provision a new workload in a distributed computing environment;
identifying, by the computing device, using a database of prior connections, a plurality of components available in a system of record (SoR) comprising a mainframe computer;
receiving, by the computing device, a selected component of at least one of the plurality of components available in the SoR;
provisioning, by the computing device, the new workload by creating a data flow using the selected component; and
adding, by the computing device, the data flow to the database of prior connections,
wherein:
the creating the data flow comprises using a system of interaction (SoI) comprising a mobile enterprise application platform to dynamically bridge between the SoR and a system of engagement (SoE) comprising a plurality of mobile devices,
the creating the data flow further comprises using an application programming interface (API) included in the SoI to connect to at least one backend system in the SoR,
Queued Direct Input Output (QDIO) for middleware residing on the mainframe computer is used to reduce a performance bottleneck from the SoR to the SoE,
the identifying the plurality of components available in the SoR comprises using a discovery process in the mainframe computer that identifies at least one middleware module on the mainframe computer and at least one backend system with which the at least one middleware module communicates,
the at least one middleware module provides transaction processing, database services, and information management services of the at least one backend system,
the creating the data flow further comprises creating a bridge that causes data to flow between a connector program module in the mainframe computer that communicates with the at least one middleware module and the mobile enterprise application platform and that causes data to flow between the mobile enterprise application platform and each of the plurality of mobile devices, and
the computing device is a cloud brokerage and the creating the bridge is performed by the cloud brokerage using a reusable application programming interface.

2. The method according to claim 1, wherein the computing device is a cloud brokerage and the distributed computing environment is a hybrid cloud.

3. The method according to claim 1, wherein the mobile enterprise application platform includes a development environment and mobile-optimized runtime middleware.

4. A computer program product comprising a computer readable storage medium having program instructions embodied therewith, the program instructions executed by a computing device to cause the computing device to:
receive a request to provision a new workload in a distributed computing environment;
identify, using a database of prior connections, a plurality of components available in a system of record (SoR) comprising a mainframe computer;
receive a selected component of at least one of the plurality of components available in the SoR;
provision the new workload by creating a data flow using the selected component; and
add the data flow to the database of prior connections,
wherein:
the creating the data flow comprises using a system of interaction (SoI) comprising a mobile enterprise application platform to dynamically bridge between the SoR and a system of engagement (SoE) comprising a plurality of mobile devices,
the creating the data flow further comprises using an application programming interface (API) included in the SoI to connect to at least one backend system in the SoR,
Queued Direct Input Output (QDIO) for middleware residing on the mainframe computer is used to reduce a performance bottleneck from the SoR to the SoE,
the identifying the plurality of components available in the SoR comprises using a discovery process in the mainframe computer that identifies at least one middleware module on the mainframe computer and at least one backend system with which the at least one middleware module communicates,
the at least one middleware module provides transaction processing, database services, and information management services of the at least one backend system, the creating the data flow further comprises creating a bridge that causes data to flow between a connector program module in the mainframe computer that communicates with the at least one middleware module and the mobile enterprise application platform and that causes data to flow between the mobile enterprise application platform and each of the plurality of mobile devices, and the computing device is a cloud brokerage and the creating the bridge is performed by the cloud brokerage using a reusable application programming interface.

5. The computer program product according to claim 4, wherein the computing device is a cloud brokerage and the distributed computing environment is a hybrid cloud.

6. A system comprising:
a hardware processor;
a computer readable memory; and
a computer readable storage medium, associated with a computing device, storing program instructions executed by the hardware processor via the computer readable memory, the program instructions comprising:
a service catalog accessor configured to invoke a database of prior connections to a plurality of components in a system of record (SoR) comprising a mainframe computer;
a discovery process invoker configured to invoke a discovery process to identify the plurality of components in the SoR; and
a data flow creator configured to receive a selected component of at least one of the plurality of components in the SoR, provision a new workload by creating a data flow using the selected component, and add the data flow to the database of prior connections,
wherein:
the data flow creator is configured to create the data flow by using a system of interaction (SoI) to dynamically bridge between the SoR and a system of engagement (SoE) comprising a plurality of mobile devices,
the data flow creator is further configured to create the data flow by using an application programming interface (API) included in the SoI to connect to at least one backend system in the SoR,
Queued Direct Input Output (QDIO) for middleware residing on the mainframe computer is used to reduce a performance bottleneck from the SoR to the SoE,
the discovery process invoker is configured to identify the plurality of components available in the SoR using a discovery process in the mainframe computer that identifies at least one middleware module on the mainframe computer and at least one backend system with which the at least one middleware module communicates,
the at least one middleware module provides transaction processing, database services, and information management services of the at least one backend system,
the data flow creator is further configured to create the data flow further by creating a bridge that causes data to flow between a connector program module in the mainframe computer that communicates with the at least one middleware module and the mobile enterprise application platform and that causes data to flow between the mobile enterprise application platform and each of the plurality of mobile devices,
the computing device is a cloud brokerage and the creating the bridge is performed by the cloud brokerage using a reusable application programming interface.

* * * * *